United States Patent [19]

Culp

[11] Patent Number: 5,182,484

[45] Date of Patent: Jan. 26, 1993

[54] RELEASING LINEAR ACTUATOR

[75] Inventor: Gordon W. Culp, Van Nuys, Calif.

[73] Assignee: Rockwell International Corporation, Seal Beach, Calif.

[21] Appl. No.: 712,821

[22] Filed: Jun. 10, 1991

[51] Int. Cl.$^5$ .......................................... H01L 41/08
[52] U.S. Cl. ........................................................ 310/328
[58] Field of Search ................................. 310/328, 323

[56] References Cited

U.S. PATENT DOCUMENTS

| | | | |
|---|---|---|---|
| 3,292,019 | 12/1966 | Hsu et al. | 310/328 |
| 3,296,467 | 1/1967 | Locher | 310/328 X |
| 4,492,891 | 1/1985 | Wieters | 310/328 |
| 4,523,120 | 6/1985 | Assard et al. | 310/323 |
| 4,622,483 | 11/1986 | Staufenberg, Jr. et al. | 310/328 |
| 4,629,039 | 12/1986 | Imoto et al. | 188/72.1 |
| 4,727,278 | 2/1988 | Staufenberg, Jr. et al. | 310/328 |
| 4,811,246 | 3/1989 | Fitzgerald et al. | 310/328 X |
| 4,841,191 | 6/1989 | Takata et al. | 310/328 X |
| 4,854,427 | 8/1989 | Yamatoh et al. | 188/72.1 |
| 4,928,030 | 5/1990 | Culp | 310/328 |
| 4,947,077 | 8/1990 | Murata | 310/328 |

Primary Examiner—Mark O. Budd
Attorney, Agent, or Firm—H. Fredrick Hamann; Harry B. Field; David C. Faulkner

[57] ABSTRACT

The present invention is useful for quickly releasing an object which is being moved by an actuator. Generally actuators of the piezoelectric type move objects slowly. For applications where an object must be quickly moved such as when releasing brakes or reinserting a control rod in a reactor core an actuator should have a quick release feature. The invention uses a set of actuators which contact a bolt and moves the bolt with smooth walking motion. The bolt in turn is driven by the actuators such that it engages an object with smooth walking motion to move or position the object. When the object is to be released the actuators are removed from contact from the bolt thereby releasing the object.

25 Claims, 2 Drawing Sheets

RELEASING LINEAR ACTUATOR

BACKGROUND OF THE INVENTION

Applicant's U.S. Pat. No. 4,928,030 teaches two- and three-axis piezoelectric actuators that position an object such as a rod or motor shaft by walking traction. A lifter piezoelectric actuator portion positions the actuator's traction member perpendicular to the object's surface. A tangenter piezoelectric actuator portion positions the actuator's traction member tangential to the object's surface. Lifter and tangenter portions of an actuator are integrally constructed and independently electrically controllable. A walking cycle consists of activating the lifter to apply a predetermined normal force between the traction member and the object while the tangenter translates the traction member at a speed equal to the surface speed of the object. During application and removal of normal force, no mechanical work is done by the traction member on the object. As the normal force is applied, a tangential strain is added to the tangenter portion. The product of the tangential force and the tangential distance traveled during the power stroke portion is the work done on the object. The work done per unit time, averaged over a complete cycle, is the power transmitted to the object.

At the end of the power portion of the cycle the tangential strain is removed as the normal force is removed by the lifter, still maintaining zero relative speed between object and traction member. As the traction member leaves the object's surface, the traction member retraces, that is, it reverses tangential stroke direction and changes speed until the opposite extreme tangential position is reached, thereby preparing for a new stroke. This is a smooth walking cycle because sliding is avoided. A pair of actuators alternately executes walking cycles, one actuator performing a power stroke while the other retraces. A predetermined coordinated positioning of the traction members of both actuators results in smooth walking. Smooth walking is defined as uninterrupted and smooth tractional power transmission without sliding.

The piezoelectric materials are generally electrically polarized ferroelectric ceramics. This class of materials is relatively brittle, having relatively little tensile strength. In addition, the temperature above the usual room temperature at which electrical polarization is irreversibly lost, usually called the Curie temperature, is relatively low. These physical properties are a detriment in some applications of walking actuators. U.S. Pat. No. 4,928,030 also teaches the use of relatively high applied voltages to achieve desirably large mechanical strokes. High voltages are a disadvantage in the context of solid state electronic drive devices, such devices having evinced more efficient operation with low voltages with relatively large currents.

Applicant's copending application Ser. No. 07/488,548 teaches the use of Fourier generation of nonsinusoidal mechanical wave forms needed for smooth walking. The teachings are primarily directed toward piezoelectric actuators, but are also directed toward electromagnetic actuators that function in a manner similar to piezoelectric ones. The benefits taught are relatively high electrical efficiency derived from resonant excitation of actuator portions, and relatively high electrical stability not normally associated with power amplifiers that drive preponderantly reactive electrical loads.

OBJECTS OF THE INVENTION

The primary object of the present invention is a walking releasing actuator that forcefully and precisely positions an object through distance which are great relative to a single actuator stroke, yet releases the object with clearance that is large relative to said actuator stroke.

Other objects are:

operate in hazardous environments such as in seawater, near radioactive materials, in space vacuum and the like;

to impart relatively large forces at moderate speeds to a positioned object;

to independently electrically control force and speed of positioning;

to forcefully position an object without bearings or springs, and with relatively few life-shortening mechanisms such as rubbing;

to forcefully position and release an object in a linear direction by simultaneous independent electrical control of multiple angularly disposed actuator action directions;

to forcefully position and release an object in three orthogonal directions of translation by simultaneous independent electrical control of multiple angularly disposed actuator action directions;

to forcefully position an object without lubricants and without lubricant seals;

to forcefully position an object using moderate voltages;

to forcefully position an object using relatively high internal energy density obtained through the use of superconductors in cryogenic applications;

to position an object with structural rigidity comparable to a solid apparatus;

to position an object by traction that is tolerant of traction surface roughness and waviness;

to position an object by tractive action that cleans the traction surface;

to operate as a generator to convert mechanical energy into electrical power;

to position an object in a micro- and in a zero-gee environment using normal tractive forces supplied by the actuators without external normal forcing means;

to operate in a fail-free mode allowing increased reliability through the use of multiple positioners walking on a common positioned object;

to operate in a fail-locked mode in applications requiring mostly forcefully held static positions and minimum cooling;

to provide an actuator manufacturing method resulting in relatively high positioning energy density through microminiaturization of actuator components;

to provide an actuator having no ohmic contacts or exposed electrical conductors;

to provide a positioning apparatus having no sliding electrical commutator;

to scale actuator size from relatively small to very large in accordance with the requirements of a large class of transducer applications;

to operate at relatively high energy density using forced fluid convection cooling in interconductor interstices;

to operate at relatively high energy density using forced fluid convection cooling through channels internal to actuator components, also allowing vacuum and space operation without exposure or loss of coolant;

to operate in intense ionizing radiation with relatively long life and little nuclear transmutation;

to be constructed with relatively light weight materials; to operate with relatively high electrical efficiency by means of magnetic flux concentrated by permeable portions;

to operate with relatively high electrical efficiency by means of magnetic flux interacting with magnetized portions;

to operate with relatively high electrical efficiency by means of piezoelectric and ferroelectric materials;

to operate with relatively high electrical efficiency by means of hybrid piezoelectric and magnetic actuator materials;

to operate with high electrical efficiency in combination with Fourier stimulation;

to operate with relatively high mechanical efficiency by means of smooth walking; and to operate with relatively high system efficiency by smooth walking combined with Fourier stimulation.

DETAILED DESCRIPTION

Figure 1:
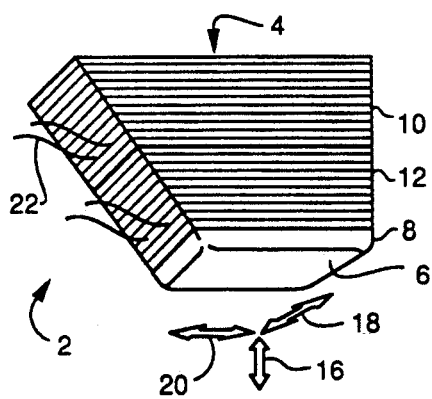
FIG. 1 is a perspective drawing of an electric walking actuator having a layered body and a traction member.

Referring to FIG. 1, shown is a perspective view of a two-axis actuator generally indicated 2, comprising a mounting base surface portion 4, a traction surface portion 6 of traction member 8, and layered actuator body portions 10, 12 of electromechanical transducer material connected to an electrical source by leads 22. The actuators used in this invention may also be thermal, magnetic or powered by some other means. The actuator body material forcefully positions traction surface 6 in predetermined directions in response to the application of a predetermined magnitude and polarity of applied electric signal. Body portion 10 causes positioning of traction member 8 in direction 16 and is hereinafter referred to as a lifter. Body portion 12 positions traction member 8 in direction 20 and is hereinafter referred to as a tangenter. A third body portion (not illustrated), similar to portion 12, acts in a third direction 18 at an angle to the action of portion 12, thus constituting a three-axis actuator. Traction member positioning directions 16, 18, and 20 may be orthogonal, and alternatively may act along predetermined relative angular directions.

Figure 2:
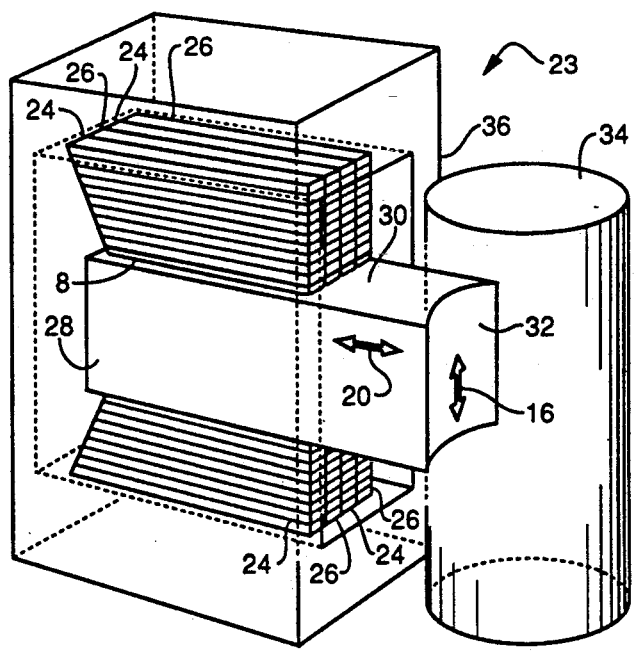
FIG. 2 is a perspective partially ghosted view of an actuator assembly of the present invention.

Referring to FIG. 2, shown partially ghosted is an actuator assembly generally indicated by arrow 23, comprising housing 36, pairs of actuators (FIG. 1) 24 and 26, bolt 28 and positioned object 34. Actuators 24 and 26 are attached by mounting surfaces (4 of FIG. 1) to inner surface portions of housing 36. Bolt 28 is a bar-like member having two opposing traction surfaces, one (30) of which is illustrated. Surfaces 30 are in tractive contact with actuator traction members 8. Traction normal force is entirely supplied by actuator lifters (10 of FIG. 1). On application of traction normal force, bolt 28 is positioned in direction 20 by actuator tangenters (12 of FIG. 1). During actuator walking, actuators 24 forcefully position bolt 28 in direction 20 while actuators 26 are retracing. Retracing entails lifting the traction members 8 clear of traction surface 30 and moving them tangentially to the opposite extreme of tangential movement in preparation for a new walking step. Actuator sets 24 and 26 act cyclically and alternately.

Bolt 28 is moved in direction 20 until bolt traction surface 32 applies a predetermined normal tractive force to positioned object 34. Upon applying the predetermined normal force to positioned object 34, walking of actuators 24 and 26 on bolt 28 ceases and coordinated actuator lifter and tangenter action cause bolt traction surface 32, in conjunction with other opposing actuator assemblies (see FIGS. 3 and 8) to walk on and thereby forcefully position object 34 in directions 16.

If the traction surface of object 34 is rough or wavy, additional actuator walking steps are made to reposition bolt 28 and reapply the predetermined tractive normal force. A positioner of the present invention comprises at least two pairs of actuator assemblies. Any number of actuator assemblies may be used to position an object. Bolts may retrace singly and in any combination in accordance with a predetermined operation time schedule. The use of many actuator assembles 23 renders the positioner relatively tolerant of a failure of one to a few actuator assemblies.

Figure 3:
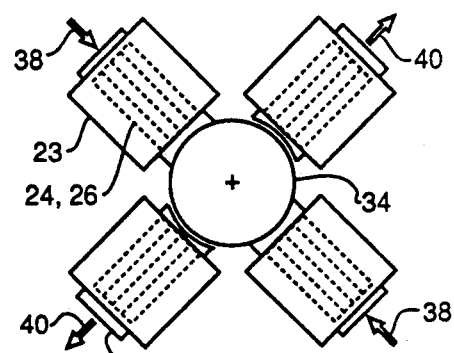
FIG. 3 is a plan view of a dual pair positioner of the present invention.
Figure 8:
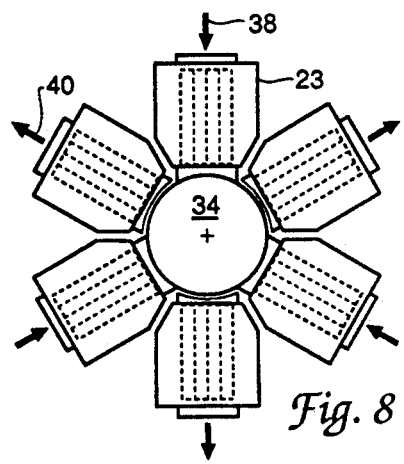
FIG. 8 is a plan view of a positioner embodiment having three pairs of actuators for kinematic stability.

Referring to FIG. 3, shown is a plan view of two pair of walking actuator assemblies 23 tractively positioning object 34 by alternating tractive strokes of opposing bolts 28. Normal forces 38 of one bolt pair accompanies a forceful positioning stroke 16 (FIG. 2), while bolt retractions 40 accompany bolt retraces. FIG. 8 is a plan view of a three-pair positioner using the same numbering and function description as that of FIG. 3. Object 34 is positiond by two alternately acting groups of three actuators 23 in this example.

Figure 4:
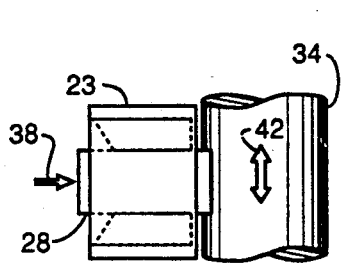
FIG. 4 is a side view of an actuator assembly showing tractive positioning.

FIG. 4 is a side view of one actuator assembly of FIG. 3 applying bolt normal force 38 to positioned object 34, while actuator lifters forcefully position in direction 42. To move the object 34, lifters on one side of bolt 28 decrease in thickness as the lifters on the opposite bolt side increase in thickness.

Figure 5:
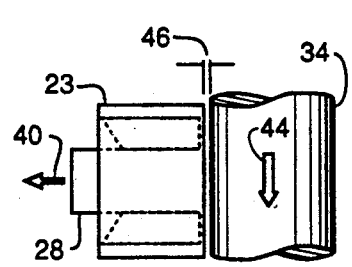
FIG. 5 is a side view of an actuator assembly releasing a positioned object.

FIG. 5 shows a side view of the actuator assembly of FIG. 4 just after actuator lifters have released their grip on the bolt, illustrating bolt release in direction 40 that precedes freeing of object 34, in this example free fall of object 34 by gravity, but it may be some other external forcing agency, in direction 44. Bolt retraction stroke 46 is predetermined to provide free fall clearance in accordance with a particular application. A diverse class of applications require a clearance 46 that is equivalent to hundreds to thousands of actuator walking steps.

Figure 6:
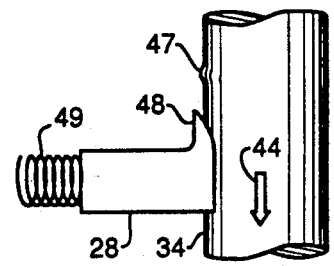
FIG. 6 is a side view of a variant of an actuator assembly having additional releasing safety features.

FIG. 6 is a side view of a variant of the actuator assembly of FIG. 4, illustrating a ski nose bolt portion 48 and a spring 49 (actuator 23 omitted for clarity). Ski nose 48 retracts a released bolt by contact with a ridge 47, or some other protrusion extending from the released object 34, the spring being optional. The spring, with or without the ski nose, is used in applications benefitting from positive bolt retraction that avoids traction surface damage due to sliding.

Figure 7:
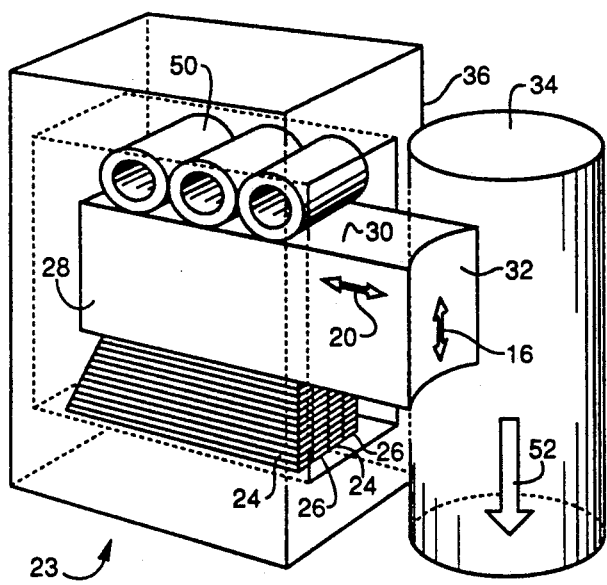
FIG. 7 is a perspective ghosted view of a positioner variant including rollers in place of a set of actuators.

FIG. 7 illustrates partially a ghosted variant of the actuator assembly of FIG. 2, retaining in part the numbering and functions of FIG. 2, this variant having hollow rollers 50 in place of the upper sets of actuator pairs of FIG. 2, and a similar variant (not illustrated) having solid rollers. The hollow roller variant is used for a diverse class of applications having force on object 34 predominantly in one direction 52, such as the weight of positioned object 34, the advantage being fewer actuators. In operation, actuators 24 apply forcing and retrace strokes to the object alternately with actuators 26 while rollers provide an elastic compliance and maintain normal force between actuators and the bolt regardless of the state of electric activation of actuator lifters. The hollow springy roller embodiment allows actuator lifter strokes to be no larger than those required to clear retracing actuator traction members as neighboring traction members assume the normal load. The hollow roller embodiment is relatively tolerant of manufacturing errors. A predetermined roller spring constant prevents the complete release of the bolt, therefore requiring the actuators to control bolt position in direction 20 at all times. The solid roller embodiment has normal force supplied solely by the action of actuator lifters. The solid roller embodiment is capable of relatively great static and positioning loads, and provides complete bolt freedom when lifters are activated to their minimum lift stroke. The solid roller embodiment requires relatively precise manufacturing.

Figure 9:
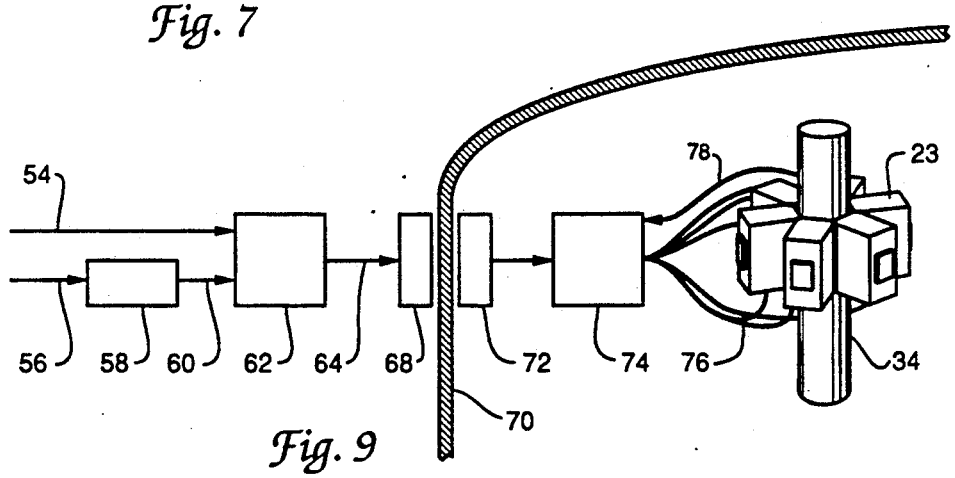
FIG. 9 is a schematic positioner system diagram using a preferred electric drive means for nuclear reactors and other pressurized apparatus.

FIG. 9 is a schematic diagram of a control system for the positioner of the present invention. The control system comprises but is not limited to electric power source 54, positioning electric criteria 56, coupling means 58, signal and power conditioner 62, transmitter 68, receiver 72, and controller 74. The positioner is shown with three pair of actuator assemblies 23 positioning an object 34. Electric power 54 has positioning criteria 56 superimposed thereon by coupler 58, the coupling being sent to the signal and power conditioner 62 via one or more wires 60. Signal and power conditioner 62 supplies signals and power in a form suitable to drive transmitter 68. Transmitter 68 may be the primary of an inductive transformer. Receiver 72 may lie inside a pressure or containment vessel 70 that is relatively more reliable when the number of vessel wall penetrations is reduced. Receiver 72 collects and forwards transmitted power and positioning criteria to controller 74. Controller 74 separates positioning criteria from the electrical power. Positioning criteria are temporarily stored, to be further conditioned and directed to controller portions that activate actuators of the positioner. System variants may also store electrical power. These latter controller portions distribute the separated electric power to the actuators in accordance with the requirements of the positioning criteria. Sensors internal to the actuators inform the controller by means of multiconductor cable 78 of the state of force and relative actuator segment position in the positioner. The controller uses sensor data to minimize error signals of actuators in comparison to positioning criteria. System components, including the positioner, located internal to the vessel are designed to sustain the environment of the particular application.

A relatively severe background of ionizing radiation urges the use of magnetic actuators having potting or hermetic sealing appropriate with the particular application. Some piezoelectric actuators may be less tolerant of radiation, or may have a relatively narrow operating temperature range, but are inherently rigid, even when no electric drive is applied. Rigidity is an advantage in uncooled applications.

Figure 10:
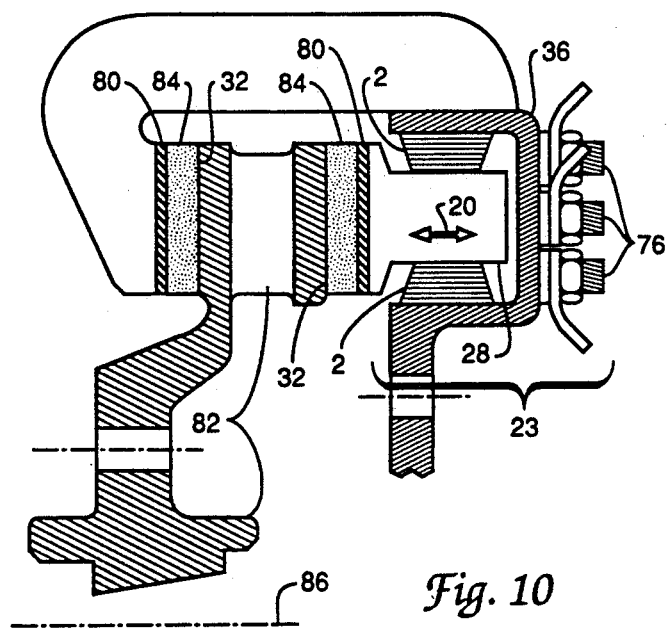
FIG. 10 is a half cross sectional view of a disk brake.

FIG. 10 is a half cross section view that is essentially symmetric about an axis 86 of rotation of a disk brake embodiment of the present invention, comprising at least one releasing actuator assembly generally indicated 23, vented brake disk 82, and actuator support means 36. Actuator assembly 23 consists of walking actuators 2 connected to and supported by support means 36, and releasable means 28. Releasable means 28 is connected to brake pads 84 and optionally by intervening thermal isolation pads 80. Application of predetermined electric signals by way of connecting electrical terminals 76 causes actuators 2 to walk releasable means 28 in directions 20 in order to vary the squeezing force between brake pads 84 that affects braking action on disk 82 through friction on disk friction surfaces 32. In a preferred variant of the embodiment removal of all electrical signals to actuators 2 releases releasable means 28 which then translates guideably in direction 20 away from the disk, allowing the disk to coast without rubbing. A spring means (not illustrated) may also be added to releasable means 28 to assure rubless coasting. Another preferred embodiment uses stored electrical energy of the controller 74 means described for FIG. 9 to apply and maintain maximum braking force in the event of predetermined conditions, such conditions including but not necessarily limited to loss of the main source of electrical power, accident, failure of a component of apparatus ancillary to the disk brake system and the like.

The advantage of the embodiment illustrated in FIG. 10 is the travel distance in directions 20 provided by the walking action of actuators 2. The travel distance is very large in comparison to the length of a single step of actuator 2. The large stroke range in directions 20 is essential to compensate for wear at friction surfaces 32, changes in dimensions due to thermal expansion, bearing clearances, and other conditions known to change braking geometry during normal use, particularly heavy use. Movement perpendicular to direction 20 of member 28 by lifters of actuators 2 more evenly distributes wear asperities at surfaces 32.

Brakes appropriate to very heavy use, such as those that stop the Space Shuttle Orbiter and similar craft, convert thousands of horsepower to heat. The heat is essentially restricted to the vicinity of the friction pads 84, and largely prevented from conducting, convecting or radiating to actuators 2 by thermal isolators 80. Isolators consist of strong, heat resistant pads of material having low thermal conductivity such as foamed ceramic composites, laminates of carbon of graphite fiber with inorganic matrix, and such like. Those versed in the related arts will appreciate the use of vents in the disk between friction surfaces 32 that disperse heat while the disk is rotating, and will recognize the use of forced convection cooling of brake disks at rest by auxiliary fluid application means.

All embodiments of the present invention use electric currents. Actuator conductor circuits have preponderantly reactive, usually a combination of capacitive and inductive, electrical impedance. Actuator activation by an electric drive means circulates a relatively large quantity of electrical power, only a small fraction of which is converted to mechanical work during walking and positioning in most applications. Relatively high actuator system electrical efficiency obtains when the electrical drive means conserves power during circulatory activation. Given the typical output component resistance of a driver, a drive means that passes converted as well as reactive power through its output components will perform less efficiently than another drive means that passes only converted power.

The preferred drive means for the present invention is Fourier stimulation and is intended to be included in the controller (74 of FIG. 9). In a device having one or more pairs of actuators, each actuator portion having multiple layers, subsets of actuator layers of one actuator are electrically connected in a circuit with the corresponding layers of another like actuator. Ancillary reactances are used when a single actuator or a group of electrically connected actuators is to be independently stimulated. Also connected in each circuit is a coupling and stimulating means such as a capacitive or inductive influence. An actuator subset may include a single layer or a group of layers. Preferably, a stimulated circuit includes one or more pairs of actuators. Each subset is stimulated in electrical (but not mechanical) resonance at a predetermined frequency and amplitude. Each subset therefore contributes a sinusoidal mechanical stroke portion to the action of the whole actuator. The inductances of actuators may be advantageously used as components of the electric drive means. The traction member of each actuator is forcefully positioned with the mechanical stroke that is the sum of the subset forceful stroke contributions. Subset stimulation frequencies and amplitudes are selected in accordance with Fourier rules for a particular nonsinusoidal mechanical stroke wave form, for example, that wave form appropriate to smooth walking. The smooth walking lifer stroke wave form is generally a rectangular wave, while the tangenter stroke wave form is a notched symmetric triangle wave. The notches provide the transfer of mechanical power to the bolt during the forcing stroke portion while the wave symmetry allows half the actuators of an actuator assembly to execute power strokes as the other half execute retraces. The triangular stroke wave form of the tangenter is composed of cosine and sine terms. Generally, varying the amplitudes of the cosine terms in Fourier proportion varies the tangential force transduced, while varying the amplitudes of the sine terms in Fourier proportion varies the tangential speed of actuation. Cosine and sine groups, being physically distinct and electrically separate, are simultaneously independently electrically controllable. These speed and force controlling methods are preferred over methods that vary frequency, since frequency variation requires more complex circuitry to maintain the benefits of electrical resonance, for example, tune tracking. Lifter group amplitude, corresponding to normal force applied to the bolt by the traction member, and excess stroke needed for traction member clearance during retrace, is varied according to the need to prevent sliding for the predetermined tangential force at each instant. The product of tangential force and power stroke distance is the work done on the bolt, the power being the work done per unit of time averaged over the walking cycle. Similarly, the product of lifter stroke and object lift distance is the work done on the positioned object during the forcing stroke portion, while the power applied to the object is the work done per bolt walking period.

Fourier stimulation affords relatively flexible methods of injecting the energy that is to be converted to mechanical power. A short pulse delivered to the input of each stimulator contains very little more energy than needed to keep each circuit amplitude at the proper Fourier value, to satisfy the operating requirements of the instant, and to replace energy that is being converted to mechanical work. Stimulating pulses are delivered anywhere during the rising portion of each sine or cosine wave, analogous to supplying a downward impulse to a child riding a swing. Stimulation pulse shape is relatively less important than the delivered pulse power. Fourier stimulation affords relatively flexible methods of adapting an actuator system to the electric drive means of a particular application. The coupling factor of the coupling-stimulating means is easily adapted to activate the actuator using a wide variety of electrical sources, such as switched DC, switched AC, conventional power mains, marine or aircraft mains, and power busses of orbital space facilities.

Fourier stimulation provides the relatively high electrical efficiency commonly associated with electrical resonance. Avoiding the use of mechanical resonance precludes the proclivity of elastic resonators to produce only sinusoidal motion, a motion that cannot achieve smooth walking. Smooth walking provides the relatively high mechanical efficiency associated with actuation without sliding. Taken together, Fourier stimulation and smooth walking achieve a system efficiency higher than that achieved by the sole use of either.

The electrical resistance of normal materials causes internal actuator heating. The effective actuator energy density is increased when internal heat generation is prevented, and in proportion to the rate at which internally generated heat is removed. Fluids are forced through interconductor clearances for cooled actuator applications. Heat is more quickly removed from myriad minified conductors because of the relatively large ratio of surface area to volume. Miniature conductors are sufficiently cooled by interconductor forced convection in many applications. Cooled macroscopic actuator embodiments have fluid channels (not illustrated) internal to the conductors. Maximum energy density obtains when all actuator components have internal cooling channels. Piezoelectric actuators do not require forced convection cooling in most applications.

Embodiments having cooling fluid supplied to and removed from internal channels by tubing operate in a vacuum without cooling fluid exposure. Internal cooling microchannels increase the energy density in minified actuator embodiments and are included in the scope of the present invention, despite increased epitaxial fabrication difficulty. A disadvantage of interconductor cooling is exposure of all traction surfaces to the coolant. Preferred forced convection interconductor cooling fluids are gasses and liquids that are not lubricants. Liquids customarily used to lubricate and cool industrial traction machines, such as smoothly variable traction speed transmissions, are insufficiently tractive to operate satisfactorily in the preferred embodiments of the present invention. Present embodiments having relatively large traction surface areas have a gridwork of shallow grooves (not illustrated), analogous to rain tire grooves, permitting egress of fluids during high speed lifter activation. Grooves are also used in traction members of actuators appropriate to applications requiring relatively frequent walking steps in the presence of air or other gasses, for example, several thousand steps per second lest well fitted tractions surfaces behave as gas bearings.

The nature of traction requires that the lifter apply a normal force that is greater than the largest tangential force by the same factor as the inverse of the rolling or translating static coefficient of traction contact friction. In a large class of actuator applications the normal force is relatively high, certainly much higher than that supplied by the mere weight of the apparatus, and commonly larger than can be supplied by practical springs. Therefore the preferred actuator lifter supplies all necessary tractive normal force rather than external exigencies such as springs or gravity. Gravity is not essential to described function, allowing zero- and micro-gee operation a priori.

Because normal force during actuator walking is relatively high, and because two or more opposed actuator pairs are used for most practical applications, the bolt, and thence the positioned object are held in a vise-like grip at all times. Groups of three bolt traction members provide kinematic stability for most shapes of positioned object. The vise-like grip of one group is replaced by the grip of the other group as normal walking proceeds, therefore never freeing the positioned object until so instructed electrically. Gripping traction members satisfy the requirements of and obviate the need for conventional bearings. Conventional bearings, either rolling element or fluid film, have finite clearances, significant structural compliances, and well known wear mechanisms. In contrast, the griping traction members behave as zero-clearance bearings with rigidity approaching that of a monolithic structure. Rubbing does not occur and contact stresses are rendered insignificant by providing a relatively large traction contact surface area.

The application examples shown in FIGS. 2 through 9 provide traction with full contact. Tangential motion entails no rubbing or rolling. Microrubbing associated with rolling is therefore completely eliminated (except the rollers of FIG. 7).

Actuators have robust construction commensurate with relatively large operating forces. The robustness of construction in combination with the endemic bearing-function rigidity provides structural stiffness that allows relatively high positioning precision. Positioning devices outside the scope of the present actuator position no more precisely than allowed by internal or ancillary position sensors. The compliances of bearings and linkages of such other positioners can only be partially compensated for by an arbitrarily precise position sensor; therefore achieving at best a fraction of the positioning precision potentially provided by a more rigid apparatus. Device compliance is more important in dynamic positioning control in which compliance reduces control bandwidth, which in turn reduces positioning accuracy.

Multilayer embodiments of the present actuator achieve high positioning accuracy by measuring the position of each layer relative to that of its neighbor. Many relative position measurement means are known. The preferred position measuring means uses electromagnetic induction for actuator layer embodiments having two or more circuits, wherein a first circuit is excited with a high frequency signal by superposition. The high frequency signal induces a voltage in a second circuit that is proportional to the overlapping area of both circuits. As one layer moves relative to its neighbor the overlapping area changes. Therefore the induced voltage is a measure of the position of one layer relative to another. Each layer or each group of layers is excited with a separate frequency. The induced voltage is detected by a frequency-sensitive amplifier to avoid inter-group cross talk. In practice, the major component of induced voltage is nulled electronically, only the changes being used to measure relative layer positions. Another position measuring means relies on the change of capacitance between actuator members.

Macroscopic components are preferred when the present invention is built in relatively large sizes, such as nuclear reactor control rod positioners, marine platform elevators, hydraulic cylinder replacements and the like. Macroscopic variants of actuators are easily made of ordinary wire and layers of appropriate material. Specially shaped conductors or magnets other than round are easily cast, drawn or rolled by dies of the appropriate configuration. Conductor, piezoelectric, magnet and permeable materials are chosen in accordance with the needs of a particular application.

The preferred method of fabricating small, miniature and microscopic embodiments of the present invention forms relatively small actuator components by one or more techniques of microminiature manufacturing, such as epitaxial deposition, photolithography, chemical etching and material transfer related processes.

As previously described, applications requiring relatively high rigidity derive the preponderance of stiffness through the use of inherently rigid actuator body materials. In electromagnetic embodiments electrically derived rigidity increases with increasing actuator electromechanical coupling factor, which in turn increases with increasing energy density.

The entire interior of housing 36 (FIGS. 2 and 7), except the space through which the bolt is positioned, may be potted with protective material. Potting material is selected which has a mechanical compliance slightly greater than that represented by motions of actuator body portions in order to limit potting-body interface stresses. Potting deformation during operation is relatively small in the majority of actuator applications that use a relatively small cylical stroke. Alternatively, actuators are hermetically sealed with a deformable sheath (not illustrated) extending between each traction member (8 of FIG. 2) and the housing.

Actuator assembly embodiments illustrated show two actuator pairs opposing opposite bolt traction surfaces. Two actuator pairs is the minimum number required to maintain kinematic stability during walking. It is to be understood that many embodiments not illustrated comprise more than two actuator pairs.

Nonmagnetic embodiments of the present invention will easily survive repeated exposure to moderately intense magnetic fields without permanent damage, albeit, may not function as desired in some fields.

Described embodiments using paramagnetic layers, for example, aluminum current sheets, allow construction of relatively light positioners. Light weight positioners benefit applications having relatively high transportation costs such as orbiting space stations and the like. Some applications may require actuator forces larger than can be produced by normal current densities above which common conductors such as copper, silver, and aluminum soften or melt. Many relatively high temperature superconductors are fabricated by common macroscopic means and by epitaxial deposition. A class of superconductors, being composed of various metal oxides, has ceramic-like physical properties. Relatively high compressive stress is borne better by ceramics than shear and tension. It should be clear that the present invention imposes predominantly compressive stresses on the load-bearing actuator components.

It is well known that apparent strength increases with mechanical component minification. Despite a relatively larger ratio of surface area to volume in miniature components, there is less surface area in which to find minute flaws that contribute to material weakness. An extreme example is a component made of a single crystal having relatively few lattice defects. The preferred microminiature manufacturing methods benefit the present invention by providing relatively high durability when components are highly stressed. In addition, rolling magnetic components are free of rubbing except for a vanishingly small component of micro-rubbing due to rolling contact. In combination with smooth walking that is free of gross rubbing during traction cycles, the present positioner has relatively few and benign life-shortening mechanisms.

Springs and other ancillary restoring force components are not used in the preferred embodiments of the present invention, excluding the optional spring of the embodiment shown in FIG. 6 and the rollers of FIG. 7, thereby avoiding fatigue due to spring bending and a concomitant propensity toward stress induced corrosion. However, a diverse class of actuator applications requires a restoring force not otherwise attainable electrically. Many applications require the actuator to supply a constant force to the positioned object or to support the weight of the object. In magnetic actuators, when no springs are used, a constant current is needed to apply a constant force, therefore requiring continuous heat removal.

Only during the forcing portion of the stroke by the actuator is work done on the positioned object. Springs acting against the tangenter forcing direction will require an increment of current to deform the spring while achieving the desired forceful stroke. Elastic energy temporarily stored in tangential acting springs is not returned to the electric drive means because of retrace. Therefore, actuators with springs will generally require larger operating currents than those without springs, and may incur a relatively lower duty cycle, being able to supply a lesser amount of useful work or power to the positioned object at a given maximum equilibrium temperature. However, the piezoelectric actuator acting against a constant-force spring produces nearly the same stroke as if the constant force were absent (albeit the stroke may be displaced by the elastic compliance of the actuator itself).

The present actuator relies in part on traction for proper function. All embodiments of the present invention use no lubricants. Lubricants offer little protection from corrosion and would in fact interfere with tractive positioning by lowering the walking coefficient of traction. An unlubricated positioner of the present invention operates well in vacuum, in space, and in a wide variety of other relatively hostile environments. Absence of lubricants allows vacuum operation without contamination, a benefit in applications such as clean rooms and in ultra-high vacuum deposition apparatus. The absence of lubricants also obviates any requirement for lubricant retainers or seals. Actuator life is not shortened by partial or complete loss of lubricant, nor is seal wear a life shortening mechanism. Further, actuator efficiency is not degraded by the power dissipated by rubbing seals.

The present actuator comprising electromechanically reciprocal body portions operates as a generator when such portions are externally mechanically excited. Excess electrical power over and above walking excitation is extracted from the tangenter circuits. For example, a battery powered marine platform may be controllably descended while stored potential energy of height is returned to the batteries. Electric excitation that losslessly circulates reactive power provides relatively high generator efficiency.

The lifter embodiments described apply a lifter force when a lifter current is applied. Piezoelectric and other electrodeformable variants of the actuator (not illustrated) have full lifter force applied with null excitation and removal of lifter force when excitation is applied, otherwise known as fail locked. Fail locked actuators preclude the use of redundant actuator assemblies positioning a common positioned component but eliminate ancillary return force springs in some applications. Fail locked actuators serve as replacements for hydraulic cylinders and the like in applications that hold a position against a relatively large force most of the time.

An example application of the present invention in an ionizing radiation environment is the positioning of fuel and moderator rods in nuclear reactors. Reactor power increases with the extent with which control rods are withdrawn from the reactor core or pile. In an emergency, also called a scram, the moderator rods are set free to drop quickly into the core. Rod insertion must be highly reliable. It is also desirable that the rods and all rod positioning components operate reliably and predictably for periods up to and including 40 years. Water shielded reactors immerse some positioning components, adding the corrosion of water to the hazard of radiation. Corrosion inevitably roughens rod surfaces. Rolling element bearings, having balls or rollers, evince a relatively short life because of stress corrosion at the rolling contacts. The positioner of the present invention (excluding FIG. 7) has no rolling element bearings. The conventional bearing function is filled by traction surfaces as previously explained. In addition, the traction surfaces apply forces over the entire traction member area, thereby minimizing stress by dint of relatively low contact pressure.

Undersea engineering and exploration relies in part on submerged robotic apparatus that must operate reliably and efficiently at relatively high pressure and in highly corrosive saline. Potted and hermetically sealed variants of the present invention sustain high pressures without resort to seals. No gross mechanical motion passes through seals. Marine platforms positioned by the present invention may descend slower or faster when released, depending on the hydrodynamic drag and the buoyancy of the particular platform. Releasing also allows positioners to accommodate surface irregularities such as barnacles. Further, the relatively large normal forces needed for tractive positioning allow the present positioner to crush and clean the surfaces of the rods along which bolts travel, adding advantageously to the life of the apparatus. Detritus remaining on traction surfaces is walked over by bolt repositioning. If remaining material is slippery (barnacle guts), internal actuator sensors detect its presence and initiate an operating mode that actively scours the traction surface (foot scuffling). Some materials form oxide and salt complexes that are more slippery than the parent material. These too may be sensed and scoured off.

Embodiments illustrated act on a round rod. It should be understood that a diverse class of embodiments accommodate positioned objects having shapes other than round. Also intended to be included in the scope of the present invention is one or more objects positioned relative to a fixed positioner, and alternatively, one or more positioners that position themselves relative to one or more fixed objects.

In summary, the releasing walking actuator constitutes a novel class of devices offering large forces with sudden large clearance release, moderate speeds, unexcelled rigidity and precision of positioning, high electrical efficiency, high mechanical efficiency, self diagnosing, self cleaning, and few and benign life shortening mechanisms. Primary anticipated applications are marine vessels, nuclear reactor rod positioners, and deep sea robotics. Devices having self-contained electrical sources applying the present invention advantageously recover potential energy by operating positioners as generators.

I claim:

1. A releasing actuator comprising,
   a bolt for engaging and moving an object, the bolt having an end and a side,
   a pair of actuators on one side of the bolt and a pair of actuators on the opposing side of the bolt, the actuators in each pair being adjacent, for engaging and moving said bolt,
   a housing adjacent to said object, said actuators attached to said housing,
   said actuators having a lifter portion and a tangenter portion wherein, said lifter portion and said tangenter portion combine to produce a first function and a second function for moving the bolt,
   said first function having a means for controlling the tangenters and lifters to move the bolt perpendicularly with respect to the object for engaging the object,
   said second function having a means for controlling the tangenters and lifters to move the bolt tangentially with respect to the object for moving the object,
   a means for controlling the lifters to release the bolt, whereby the object is released by the bolt.

2. A releasing actuator assembly as in claim 1 where each pair of actuators comprises a first actuator and a second actuator,
   wherein the first function moves the bolt by having a cycle wherein the first actuator extends its lifter portion to contact the surface of the bolt,
   then the tangenter portion moves the bolt toward or from the object,
   then the lifter portion retracts lifting the actuator off the bolt and the tangenter portion retraces to its starting position completing the cycle,
   the second actuator progresses through the same cycle 180 degrees out of phase with the first actuator,
   either the first actuator or the second actuator from each pair is always in contact with the bolt, thus holding the bolt, at all times.

3. A releasing actuator assembly as in claim 1 where the pair of actuators comprises a first actuator and a second actuator,
   wherein the second function moves the bolt by having a cycle wherein, the lifters in all the actuators move in one direction simultaneously, while the bolt is engaging the object, thus moving the object,
   the bolt is then withdrawn from contact with the object by the first function and the lifters moved in the opposite direction, the first function then moves the bolt back into contact with the object and the cycle is repeated.

4. A releasing actuator assembly as in claim 2 wherein the second function moves the bolt by having a cycle wherein,
   the lifters in all the actuators move in one direction simultaneously, while the bolt is engaging the object, thus moving the object,
   the bolt is then withdrawn from contact with the object by the first function and the lifters moved in the opposite direction, the first function then moves the bolt back into contact with the object and the cycle is repeated.

5. A releasing actuator assembly of claim 1 wherein there are two pair of actuator assemblies a first pair and a second pair,
   each pair having its actuator assemblies on opposite sides of the object,
   where said first pair of actuator assemblies have cycles which are controlled such that their bolts extend to contact the object simultaneously, move the object simultaneously, are withdrawn from the object simultaneously and retrace to complete their cycle simultaneously,
   and said second pair of actuator assemblies have cycles which are controlled such that their bolts extend to contact the object simultaneously and move the object simultaneously, are withdrawn from the object simultaneously and retrace to complete their cycle simultaneously,
   said first pair of actuator assemblies and said second pair of actuator assemblies have cycles which are 180 degrees out of phase with each other so that one pair of bolts are in contact with and hold the object at all times.

6. A releasing actuator assembly of claim 1 wherein there are three pair of actuator assemblies a first pair, a second pair, and a third pair, each pair having its actuator assemblies on opposite sides of the object,
   where one bolt from each pair of actuator assemblies have matching cycles which are controlled such that their bolts extend to contact the object simultaneously, move the object simultaneously, are withdrawn from the object simultaneously and retrace to complete their cycle simultaneously,
   where said first, second and third pair of actuator assemblies have cycles for each bolt which are 180 degrees out of phase with each other.

7. A releasing actuator assembly as in claim 1 wherein there is a means to have all the lifters retract simultaneously to release the bolt from engaging the object.

8. A releasing actuator assembly as in claim 1 wherein one pair of actuators is replaced by a roller which is in compression contact with the bolt.

9. A releasing actuator assembly as in claim 7 wherein the bolt has a ski nose and the object has a ridge to contact the ski nose and move the bolt out of contact with the object.

10. A releasing actuator assembly as in claim 1 wherein the object is a control rod in a nuclear reactor.

11. A releasing actuator assembly as in claim 1 wherein the control means includes a means of transmitting actuator movement signals to the actuator assembly.

12. A releasing actuator assembly as in claim 1 wherein the control means includes a means of providing position information from the lifter and tangenter portions to the controller.

13. A releasing actuator assembly as in claim 1 wherein there are at least two pair of actuators on each side of the bolt.

14. A releasing actuator assembly of claim 4 wherein there are two pair of actuator assemblies a first pair and a second pair,
- each pair having its actuator assemblies on opposite sides of the object,
- where said first pair of actuator assemblies have cycles which are controlled such that their bolts extend to contact the object simultaneously, move the object simultaneously, are withdrawn from the object simultaneously and retrace to complete their cycle simultaneously,
- and said second pair of actuator assemblies have cycles which are controlled such that their bolts extend to contact the object simultaneously and move the object simultaneously, are withdrawn from the object simultaneously and retrace to complete their cycle simultaneously,
- said first pair of actuator assemblies and said second pair of actuator assemblies have cycles which are 180 degrees out of phase with each other so that one pair of bolts are in contact with and hold the object at all times.

15. A releasing actuator assembly of claim 4 wherein there are three pair of actuator assemblies a first pair, a second pair, and a third pair, each pair having its actuator assemblies on opposite sides of the object,
- where one bolt from each pair of actuator assemblies have matching cycles which are controlled such that their bolts extend to contact the object simultaneously, move the object simultaneously, are withdrawn from the object simultaneously and retrace to complete their cycle simultaneously,
- where said first, second and third pair of actuator assemblies have cycles for each bolt which are 180 degrees out of phase with each other.

16. A releasing actuator assembly as in claim 4 wherein there is a means to have all the lifters retract simultaneously to release the bolt from engaging the object.

17. A releasing actuator assembly as in claim 5 wherein there is a means to have all the lifters retract simultaneously to release the bolt from engaging the object.

18. A releasing actuator assembly as in claim 6 wherein there is a means to have all the lifters retract simultaneously to release the bolt from engaging the object.

19. A releasing actuator assembly for disc brakes comprising,
- a bolt having a disc brake pad for engaging a disc on a disc brake,
- a pair of actuators on one side of the bolt and a pair of actuators on the opposing side of the bolt,
- the actuators in each pair being adjacent, for engaging and moving said bolt,
- the actuators attached to a housing adjacent to the disc of a disc brake,
- the housing having an arm with a second brake pad extending to the opposing side of the disc from where the bolt brake pad engages the disc,
- said actuators having a lifter portion and a tangenter portion wherein, said lifter portion and tangenter portion combine to produce a first function and a second function for moving the bolt,
- in said first function there is a means for controlling the tangenters and lifters to work in conjunction to move the bolt perpendicularly with respect to the disc of the disc brake, so the brake pads can act as calipers for engaging the disc brake,
- in said second function there is a means for the releasing of the bolt so that the brake pads can disengage from the disc on the disc brake.

20. A releasing actuator as in claim 19 where each pair of actuators comprises a first actuator and a second actuator,
- wherein the first function moves the bolt by having a cycle wherein the first actuator extends its lifter portion to contact the surface of the bolt,
- then the tangenter portion moves the bolt toward or from dics on the disc brake,
- then the lifter portion retracts lifting the actuator off the bolt and the tangenter portion retraces to its starting position completing the cycle,
- the second actuator progresses through the same cycle 180 degrees out of phase with the first actuator,
- either the first actuator or the second actuator from each pair is always in contact with the bolt, thus holding the bolt, at all times.

21. A releasing actuator assembly as in claim 19 where the pair of actuators comprises a first actuator and a second actuator,
- wherein the second function is a releasing of the brake pads from the disc of the disc brake wherein, the lifters in all the actuators retract thus releasing the bolt.

22. A releasing actuator assembly as in claim 20 where the pair of actuators comprises a first actuator and a second actuator,
- wherein the second function is a releasing of the brake pads from the disc of the disc brake wherein, the lifters in all the actuators retract thus releasing the bolt.

23. A releasing actuator as in claim 22 where the break pads have a spring means to remove the brake pads from the disc of the disc brakes when the actuators are removed from the bolt.

24. A releasing actuator assembly comprising,
- a housing having opposing interior surfaces,
- at least one pair of electrodeformable biaxial walking actuators respectively affixed to said opposing interior surfaces,
- a bolt having sides and an end, the sides being proximate said actuators for engagement by the actuators, the end of the bolt extending out of the housing and proximate an object for engaging the object,
- a means of generating electrical signals for controlling the electrodeformable actuators,
- a means of connecting said electrical signals to said actuators,
- said electrical signals direct the actuators to move the bolt on one axis for engaging the object and on a second axis for moving the object, said electrical signals direct the actuators to disengage the bolt for releasing the object.

25. A releasing actuator assembly comprising, a housing having opposing interior surfaces, at least one pair of electrodeformable triaxial walking actuators respectively affixed to said opposing interior surfaces a bolt having sides and an end, the sides being proximate said actuators for engagement by the actuators, the end of the bolt extending out of the housing and proximate an object for engaging the object, a means of generating electrical signals for controlling the electrodeformable actuators, a means of connecting said electrical signals to said actuators, said electrical signals direct the actuators to move the bolt on one at least one axis for engaging the object and on at least one axis for moving the object, said electrical signals direct the actuators to disengage the bolt for releasing the object.

* * * * *